(12) United States Patent
Sung et al.

(10) Patent No.: US 10,387,009 B2
(45) Date of Patent: Aug. 20, 2019

(54) MULTIMEDIA APPARATUS AND METHOD FOR PROVIDING CONTENT

(71) Applicant: Samsung Electronics Co., Ltd., Gyeonggi-do (KR)

(72) Inventors: Yeul-tak Sung, Seoul (KR); Jae-woo Ko, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 319 days.

(21) Appl. No.: 15/132,780

(22) Filed: Apr. 19, 2016

(65) Prior Publication Data

US 2016/0231905 A1   Aug. 11, 2016

Related U.S. Application Data

(63) Continuation of application No. 13/228,176, filed on Sep. 8, 2011, now Pat. No. 9,330,099.

(30) Foreign Application Priority Data

Sep. 9, 2010   (KR) .................. 10-2010-0088505

(51) Int. Cl.
*G06F 3/0484*   (2013.01)
*G06F 16/44*   (2019.01)
(Continued)

(52) U.S. Cl.
CPC ........ *G06F 3/04842* (2013.01); *G06F 3/0482* (2013.01); *G06F 3/0486* (2013.01);
(Continued)

(58) Field of Classification Search
CPC ............. G06F 3/04842; G06F 3/04817; G06F 3/0482; G06F 3/0486; G06F 17/30038;
(Continued)

(56) References Cited

U.S. PATENT DOCUMENTS 5,305,435 A   4/1994   Bronson
5,880,733 A   3/1999   Horvitz et al.
(Continued)

FOREIGN PATENT DOCUMENTS

JP   2010-097552   4/2010
KR   1020090035333   4/2009
(Continued)

OTHER PUBLICATIONS

European Search Report dated Dec. 14, 2015 issued in counterpart application No. 11823770.0-1952, 9 pages.
(Continued)

*Primary Examiner* — Dino Kujundzic
(74) *Attorney, Agent, or Firm* — The Farrell Law Firm, P.C.

(57) ABSTRACT

A multimedia apparatus and a method for providing content by generating at least one flag on a screen; designating categories with respect to the at least one flag; and if one of the at least one flags is moved to a particular content displayed on the screen, setting the particular content to the category corresponding to the one flag. Therefore, content is classified and managed according to categories by using a flag, and thus a user further intuitively manages and accesses content.

10 Claims, 9 Drawing Sheets

(51) Int. Cl.
    *G06F 16/48*     (2019.01)
    *G06F 16/904*    (2019.01)
    *G06F 16/907*    (2019.01)
    *G06F 16/954*    (2019.01)
    *G06F 16/955*    (2019.01)
    *G06F 3/0486*    (2013.01)
    *G06F 3/0481*    (2013.01)
    *G06F 3/0482*    (2013.01)

(52) U.S. Cl.
    CPC .......... *G06F 3/04817* (2013.01); *G06F 16/44* (2019.01); *G06F 16/48* (2019.01); *G06F 16/904* (2019.01); *G06F 16/907* (2019.01); *G06F 16/954* (2019.01); *G06F 16/9562* (2019.01)

(58) Field of Classification Search
    CPC ......... G06F 17/30058; G06F 17/30873; G06F 17/30994; G06F 17/30997
    See application file for complete search history.

(56) References Cited

U.S. PATENT DOCUMENTS

| | | | |
|---|---|---|---|
| 6,014,677 A | 1/2000 | Hayashi et al. | |
| 6,229,542 B1 | 5/2001 | Miller | |
| 6,934,718 B2 | 8/2005 | Davidsson | |
| 7,216,290 B2 | 5/2007 | Goldstein et al. | |
| 7,421,155 B2 | 9/2008 | King et al. | |
| 8,401,592 B2 | 3/2013 | Roh et al. | |
| 9,973,612 B2 | 5/2018 | Son et al. | |
| 2002/0069252 A1 | 6/2002 | Jones et al. | |
| 2002/0107829 A1 | 8/2002 | Sigurjonsson et al. | |
| 2004/0019611 A1 | 1/2004 | Pearse et al. | |
| 2004/0064455 A1 | 4/2004 | Rosenzweig et al. | |
| 2005/0091578 A1* | 4/2005 | Madan ................. G06F 17/241 715/201 |
| 2005/0210145 A1 | 9/2005 | Kim et al. | |
| 2005/0216526 A1 | 9/2005 | Kumagai | |
| 2006/0036568 A1 | 2/2006 | Moore et al. | |
| 2006/0129914 A1 | 6/2006 | Ellis et al. | |
| 2007/0028171 A1* | 2/2007 | MacLaurin ........... G06F 3/0482 715/705 |
| 2007/0300169 A1* | 12/2007 | Jones .................... G06F 17/211 715/764 |
| 2008/0184138 A1 | 7/2008 | Krzanowski et al. | |
| 2008/0276177 A1 | 11/2008 | Sauve | |
| 2008/0306921 A1 | 12/2008 | Rothmuller et al. | |
| 2009/0098910 A1 | 4/2009 | Roh et al. | |
| 2009/0193351 A1 | 7/2009 | Lee et al. | |
| 2010/0037167 A1 | 2/2010 | Son et al. | |
| 2010/0146015 A1* | 6/2010 | Milic-Frayling ........................... G06F 17/30038 707/812 |
| 2010/0262659 A1 | 10/2010 | Christiansen et al. | |
| 2010/0312766 A1 | 12/2010 | Horn | |
| 2010/0325211 A1 | 12/2010 | Ylinen et al. | |
| 2011/0154507 A1 | 6/2011 | King et al. | |
| 2012/0303629 A1 | 11/2012 | Klein et al. | |

FOREIGN PATENT DOCUMENTS

| | | |
|---|---|---|
| KR | 1020090069300 | 6/2009 |
| KR | 1020090083126 | 8/2009 |
| KR | 1020100010301 | 2/2010 |
| KR | 1020100019024 | 2/2010 |
| KR | 1020100037945 | 4/2010 |

OTHER PUBLICATIONS

Korean Office Action dated Mar. 21, 2017 issued in counterpart application No. 10-2010-0088505, 11 pages.
European Search Report dated Jan. 11, 2019 issued in counterpart application No. 11823770.0-1952, 8 pages.

* cited by examiner

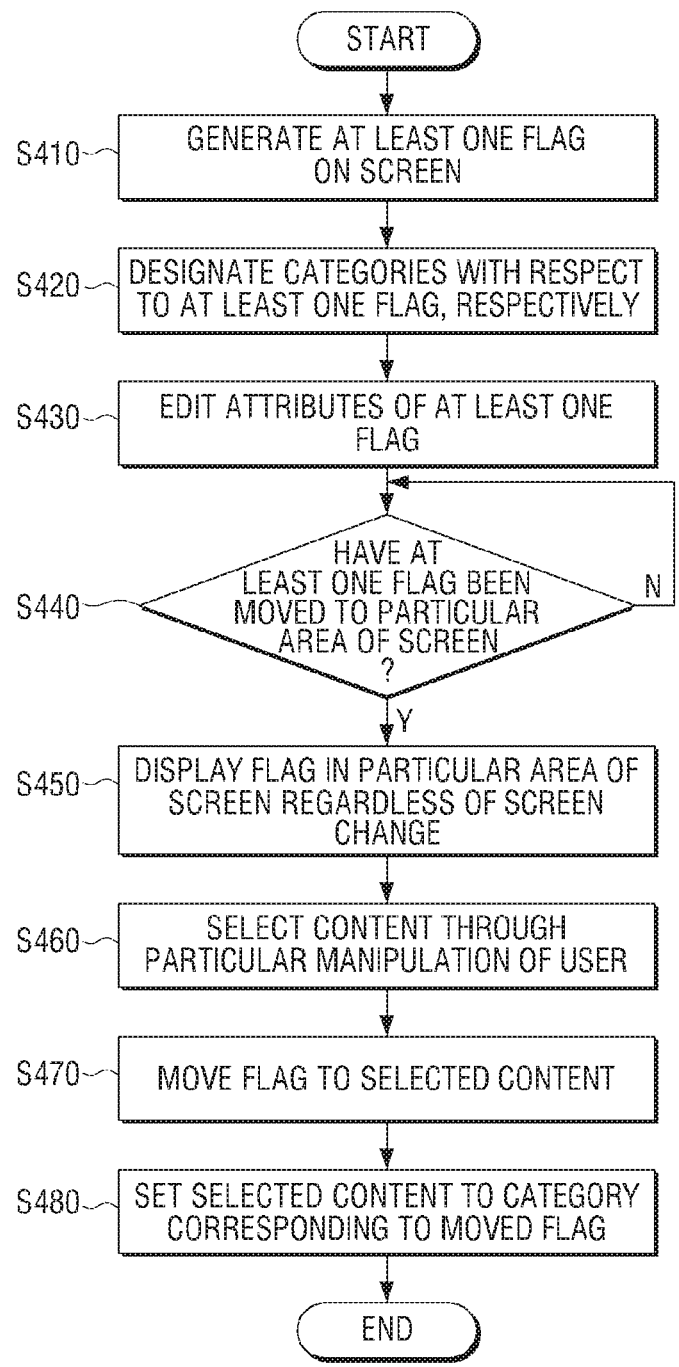

MULTIMEDIA APPARATUS AND METHOD FOR PROVIDING CONTENT

PRIORITY

This application claims priority under 35 U.S.C. § 120 to U.S. application Ser. No. 13/228,176, filed on Sep. 8, 2011 and issuing on May 2, 2016, as U.S. Pat. No. 9,330,099, claiming priority under 35 U.S.C. § 119(a) to Korean Patent Application No. 10-2010-0088505, which was filed on Sep. 9, 2010, in the Korean Intellectual Property Office, the entire disclosures of all of which are incorporated herein by reference.

BACKGROUND OF THE INVENTION

1. Field of the Invention

The present invention relates generally to a multimedia apparatus and a method for providing content thereof, and more particularly, to a multimedia apparatus for displaying and editing various types of content and a method for providing content.

2. Description of the Related Art

A multimedia apparatus can store a lot of content, such as video content, image content, audio content, text content, and the like, within one apparatus which allows a user to reproduce various fields of content through one multimedia apparatus.

However, as the amount of content increases, it becomes more difficult for a user to remember the storage location of all content stored in the multimedia apparatus, which also makes it difficult to search for desired content. Also, viewing previously searched content becomes more difficult because the user does not usually intuitively know the location of the previously searched content, which also makes it difficult for the user to search for the previously searched content.

Also, as the amount and variety of content increases, the user needs to classify and manage content according to desired categories.

Accordingly, the user requires a method for further intuitively accessing a large number of content and sorting out and managing the content according to categories.

SUMMARY OF THE INVENTION

Accordingly, the present invention has been made to solve the above-mentioned problems occurring in the prior art, and the present invention provides a method and apparatus for providing content by which at least one flag is generated on a screen, categories are respectively designated with respect to the at least one flag, and if one of the at least one flags is moved to a particular content displayed on the screen, the particular content is set to the category corresponding to the one flag.

According to an aspect of the present invention, there is provided a method for providing content of a multimedia apparatus, the method including generating at least one flag on a screen; designating categories with respect to the at least one flag; and if one of the at least one flags is moved to a particular content displayed on the screen, setting the particular content to the category corresponding to the one flag.

According to another aspect of the present invention, there is provided a multimedia apparatus including a Graphic User Interface (GUI) generator configured to generate at least one flag; a display unit configured to display the at least one flag on a screen; and a controller configured to respectively designate categories with respect to the at least one flag according to a particular input of a user and, if one of the at least one flags is moved to a particular content displayed on the display unit, to set the content to the category corresponding to the one flag.

BRIEF DESCRIPTION OF THE DRAWINGS

The above and other features, aspects and advantages of the present invention will be more apparent and more readily appreciated from the following detailed description taken in conjunction with the accompanying drawings, in which:

FIG. 4 is a flowchart illustrating a method for proving content by using a flag of a multimedia apparatus according to an embodiment of the present invention.

DETAILED DESCRIPTION OF EMBODIMENTS OF THE PRESENT INVENTION

Figure 1:
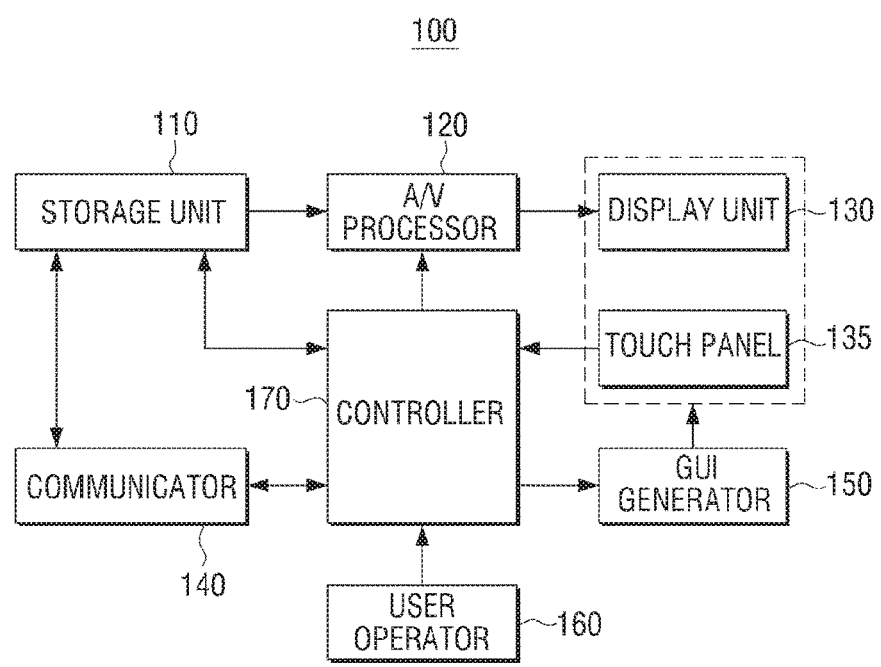
FIG. 1 is a block diagram illustrating a detailed structure of a multimedia apparatus according to an embodiment of the prevent invention.

Hereinafter, the present invention will be described in detail with reference to the accompanying drawings, in which aspects of the present invention are illustrated. In the following description, same drawing reference numerals are used for the same elements throughout the drawings. While the embodiments are described with detailed construction and elements to assist in a comprehensive understanding of the various embodiments, the embodiments can be implemented without those specific details. Also, well-known functions or constructions may be omitted so as to avoid obscuring the description with unnecessary detail. It should be also noted that in the drawings, the dimensions of the features are not intended to be to true scale.

FIG. 1 is a block diagram of a multimedia apparatus 100 according to an embodiment of the prevent invention. Referring to FIG. 1, the multimedia apparatus 100 includes a storage unit 110, an Audio/Video (A/V) processor 120, a display unit 130, a touch panel 135, a communicator 140, a Graphical User Interface (GUI) generator 150, a user operator 160, and a controller 170.

The storage unit 110 provides a storage space for storing content and includes an embedded storage device and a removable storage device. Examples of the content stored in the storage unit 110 include image content, video content, music content, text content, etc. The storage unit 110 may also store a multimedia content file received through the communicator 140.

The storage unit 110 may classify and store content according to a category corresponding to a flag. Here, the flag is an icon which is used by a user to store and manage content according to the category to search for or execute the content later. If the flag is moved to a particular content, the particular content is classified and stored in the category corresponding to the flag.

The A/V processor 120 performs signal processing, such as video decoding, video scaling, audio decoding, and the like, with respect to the video content and the audio content stored in the storage unit 110. The A/V processor 120 also outputs the video content to the display unit 130 and outputs the audio content to a sound output unit (not shown).

The display unit 130 displays the video content output from the A/V processor 120. The display unit 130 also adds GUI generated by the GUI generator 150, described below, to the video content and displays the GUI added to the video content.

The touch panel 135 is provided at a display panel and senses a user touch input through the display panel. The touch panel 135 transmits content of the sensed user touch input to the controller 170.

The communicator 140 is connected to an external device or an external network to communicate with the external device or the external network. Here, through a particular input of a user, the communicator 140 may upload content, which are selected from a content list classified into at least one category, to the external device or the external network.

Figure 2A:
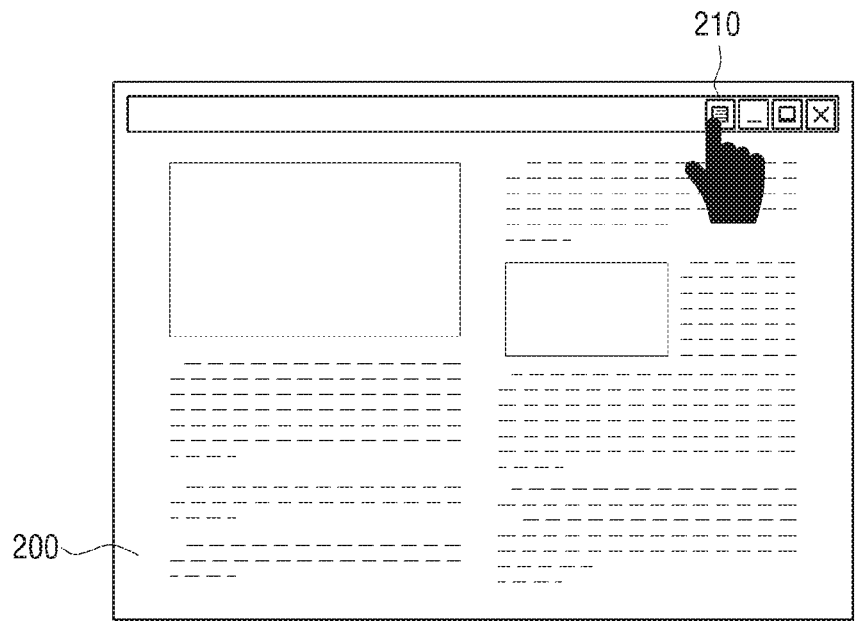
FIGS. 2A through 2K are diagrams illustrating a method for providing content by using a flag according to an embodiment of the present invention.
Figure 2B:
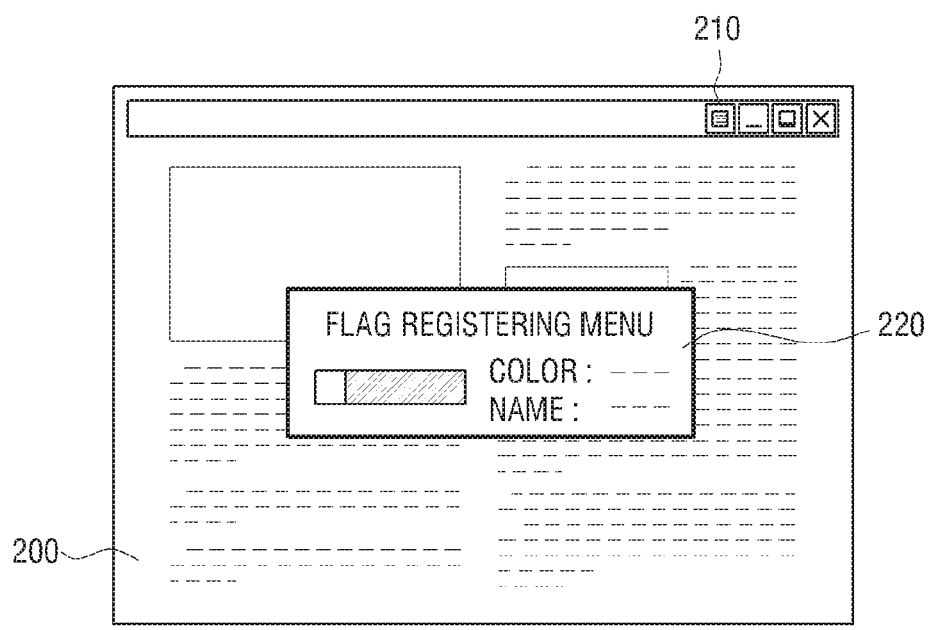
Figure 2C:
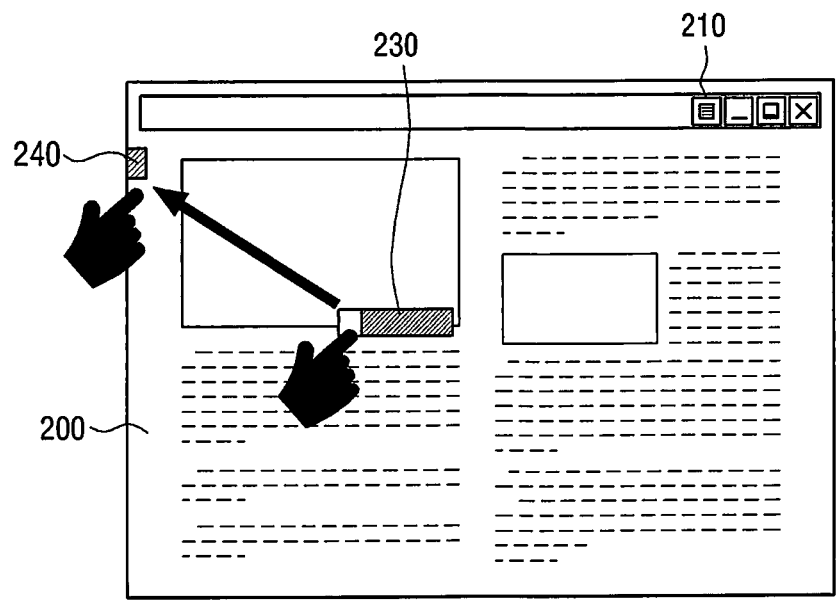
Figure 2D:
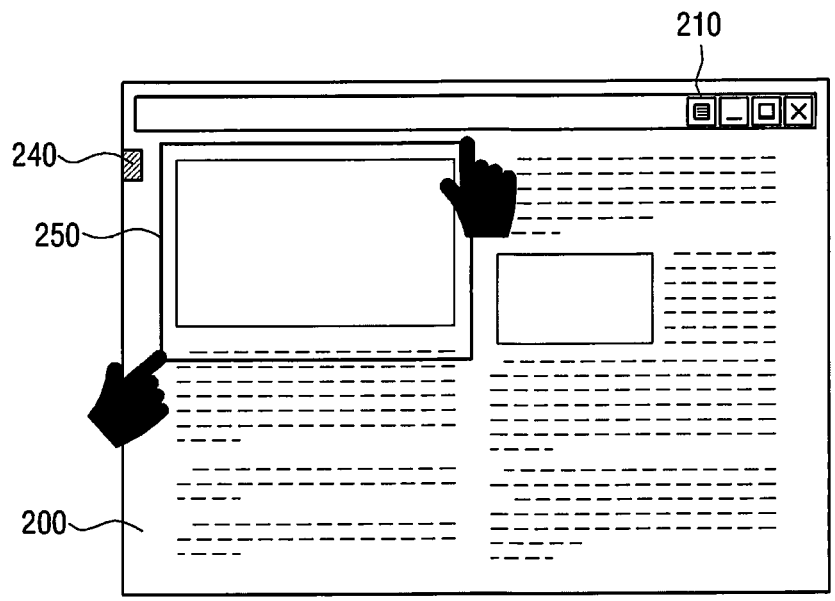

The GUI generator 150 generates the GUI which is to be provided to the user. The GUI generated by the GUI generator 150 may be displayed in On-Screen Display (OSD) menu form on a screen. In particular, the GUI generator 140 may generate at least one flag which are used to classify, store, and manage content according to categories of the multimedia apparatus 100 as shown in FIGS. 2A through 3. A method for providing content by using a flag will be described later with reference to FIGS. 2A through 3.

The user operator 160 is a physical means which receives a user command. Operation buttons provided at an external case of the multimedia apparatus 100 correspond to the user operator 160. The user operator 160 and the touch panel 135 may be combined with each other.

The controller 170 controls an operation of the multimedia apparatus 100 according to the user command input through the touch panel 135 and the user operator 160.

In particular, the controller 170 stores and provides content according to categories respectively corresponding to at least one flags by using the at least one flags.

A method for providing content by using a flag will now be described in detail with reference to FIGS. 2A through 3.

As shown in FIG. 2A, the controller 170 controls the display unit 130 to display a flag generating icon 210 in a particular area of a display screen or display window 200. Here, the flag generating icon 210 may be displayed at all times as shown in FIG. 2A or may be included in a menu screen which is generated through the user input.

If the flag generating icon 210 is selected through the touch panel 135, the controller 170 displays a flag registering menu 220. If the displayed flag generating icon 210 is touched twice consecutively, the controller 170 displays the flag registering menu 220 in the center of the display screen 200 as shown in FIG. 2B. Here, the controller 170 may designate a category of a flag through the flag registering menu 220.

The controller 170 may also edit an attribute of the flag through the flag registering menu 220. In FIG. 2B, the controller 170 may designate a color and a name of the flag on the flag registering menu 220 through the touch panel 135 to edit the attribute of the flag. For example, the controller 170 may designate the color of the flag as red and may edit the name of the flag as a famous restaurant. Therefore, the user may check a category of the flag through the color and the name of the edited flag.

After the controller 170 registers the flag, the controller 170 generates and displays a flag 230. If the flag 230 is moved to a particular area of the display screen 200 through the touch panel 135, the controller 170 displays the flag 230 in the particular area of the display screen 200 regardless of a screen change of the display screen 200. If the flag 230 is dragged to an area positioned at a top left of the display screen 200 as shown in FIG. 2C, the controller 170 displays a flag 240 in the area positioned at the top left of the display screen 200. Here, the flag 240 positioned at the top left of the display screen 200 may become smaller than the flag 230 displayed in the center of the display screen 200 so as not to interrupt the display screen 200. However, the flag 240 positioned at the top left of the display screen 200 has the same color as the flag 230 positioned in the center of the display screen 200.

Although the display screen 200 is changed, the flag 240 positioned at the top left of the display screen 200 is displayed at all times. That is, the flag 240 positioned at the top left of the display screen 200 is displayed at all times until a removal command of the user is not input. Also, if the flag 240 positioned at the top left of the display screen 200 is generated, the flag 230 displayed in the center of the display screen 200 may disappear.

Although it has been described that the flag 230 is moved to the top left of the display screen 200, the flag 230 may also be moved to another area of the display screen 200, for example, to a left bottom or a right top of the display screen 200.

If the flag 240 positioned at the top left is generated and then moved to a particular content area 250 through the touch panel 135, the controller 170 sets the particular content area 250 to a category corresponding to the flag 230.

Here, the particular content area 250 may be selected by the user. Specifically, as shown in FIG. 2D, the controller 170 drags and selects the particular content area 250 through the touch panel 135. The particular content area 250 may include video content, image content, text content, Internet website addresses, combinations thereof, and the like.

Figure 2E:
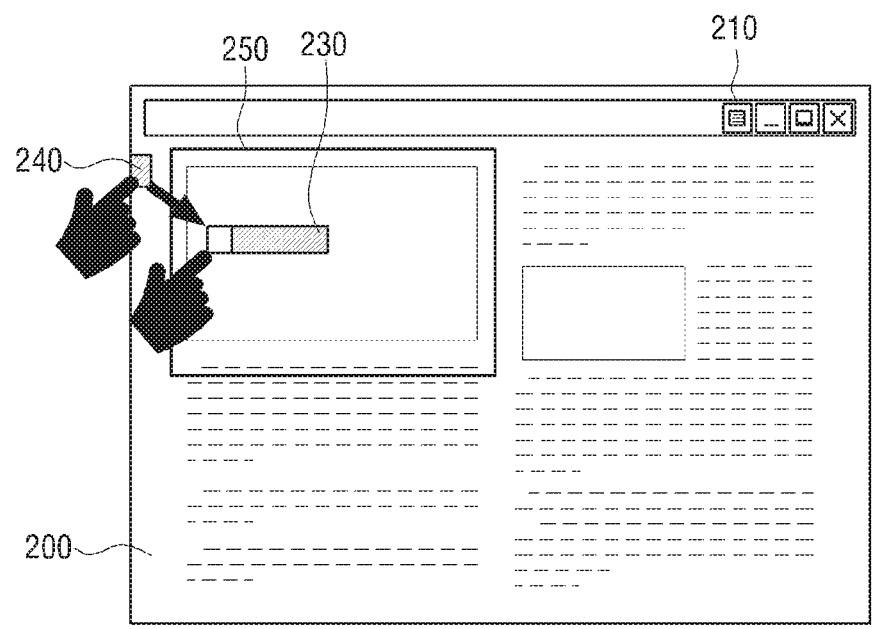
Figure 2F:
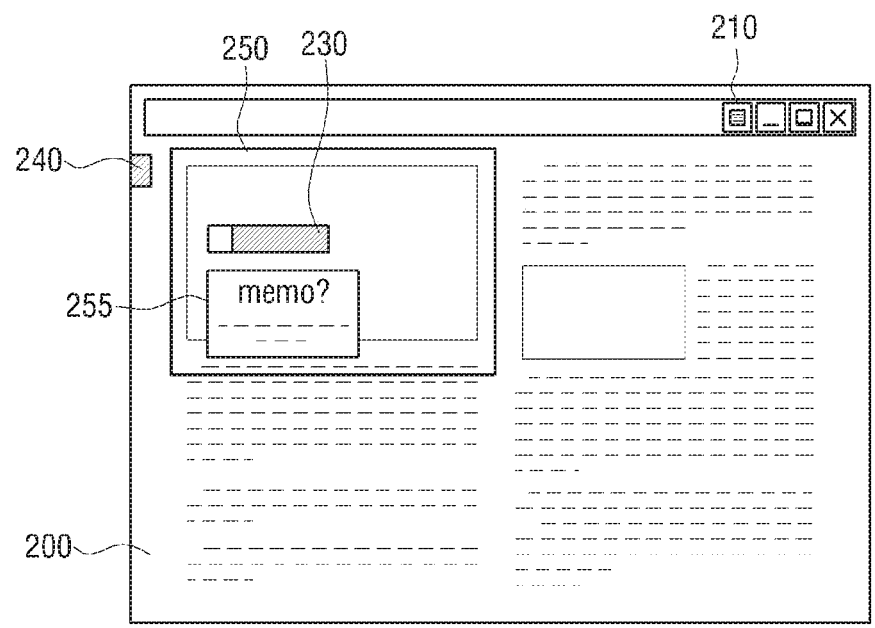
Figure 2G:
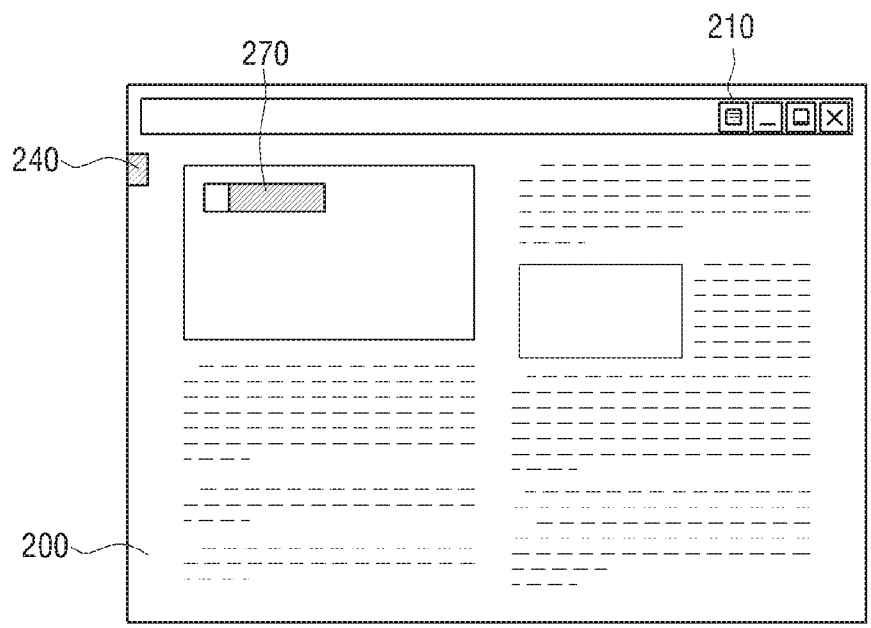
Figure 3:
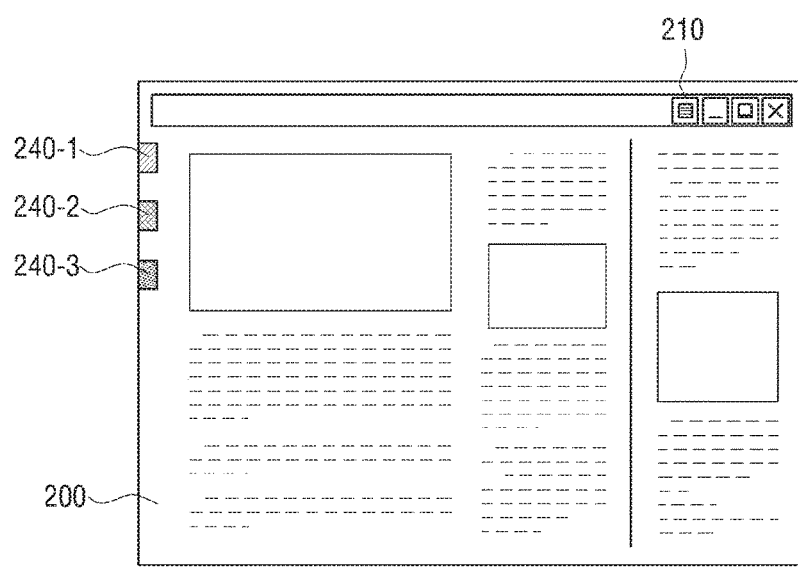
FIG. 3 is a diagram illustrating a display screen including at least two or more flags according to an embodiment of the present invention.

If the flag 240 positioned at the top left is dragged to the particular content area 250 after the particular content area 250 is selected as shown in FIG. 2E, the controller 170 may display a memo menu 255 of the particular content area 250 as shown in FIG. 2F. If a memo of the particular content area 250 is ended through the touch panel 135, the controller 170 sets the particular content area 250 to the category corresponding to the flag 230.

The particular content area 250 may be designated by the user, or alternatively, the flag 240 positioned at the top left is dragged directly to a particular image content, the controller 170 may set the particular image content to the category corresponding to the flag 230. Also, if the flag 240 positioned at the top left is dragged directly to a particular text content, the controller 170 may set a paragraph of text content belonging to a dragged position to the category corresponding to the flag 230. In addition, if the flag 240 positioned at the top left is dragged directly to an Internet website address, the controller 170 may set the Internet website address to the category corresponding to the flag 230.

After the controller 170 set the particular content area 250 to the category corresponding to the flag 230, the controller 170 may display a mark (hereinafter referred to as a flag mark) 270 indicating that a flag has been designated around the particular content area 250. Here, even if the particular content area 250 returns to the display screen 200 after the display screen 200 is changed several times, the flag mark 270 displayed around the particular content area 250 may not disappear but may be continuously displayed.

Also, if the flag 240 displayed at the top left is selected, the controller 170 displays a content list 260 included in a category corresponding to the flag 240.

Figure 2H:
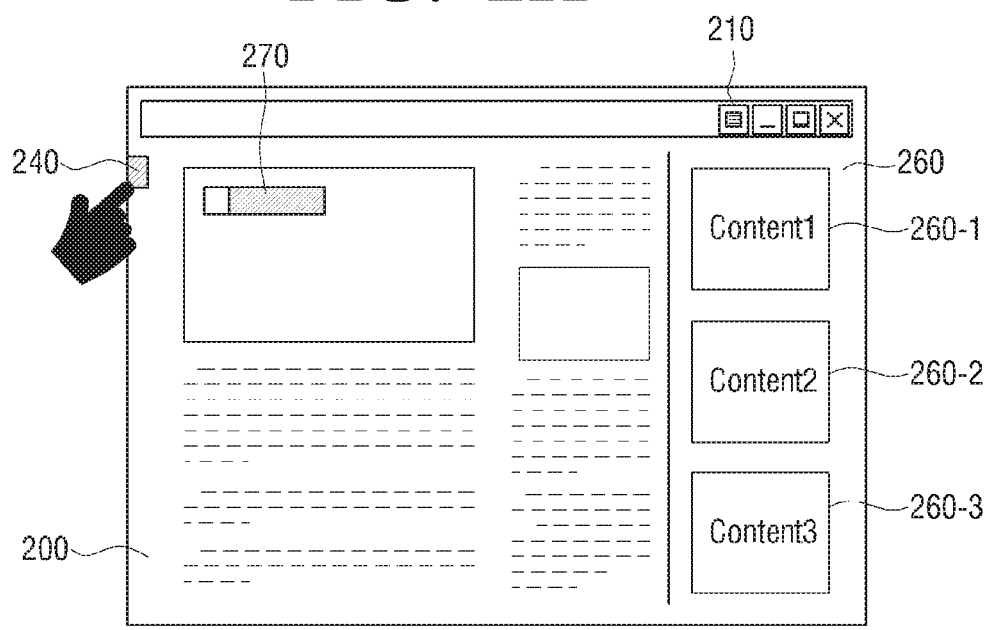

If the flag 240 displayed at the top left is touched twice consecutively as shown in FIG. 2H, the controller 170 displays the content list 260, which is included in the category corresponding to the flag 240, in a right area of the display screen 200. For example, if the category corresponding to the flag 240 is a famous restaurant, content related to a famous restaurant designated by the user may be displayed in the content list 260.

Here, the content list 260 may include content-related information. Specifically, the content list 260 may include at least one of a name of content, a file name, a thumbnail image, a memo content, a generation date, and a website address.

It has been described that the content list 260 is displayed in the right area of the display screen 200, but this is only an embodiment. Therefore, the content list 260 may be displayed in another area of the display screen 200. For example, the content list 260 may be displayed in a whole area of the display screen 200, in a part of the center of the display screen 200, or in a left area of the display screen 200.

The controller 170 may drag and drop at least one content, included in the content list 260, to a document file in order to paste the at least one content to the document file.

Figure 2I:
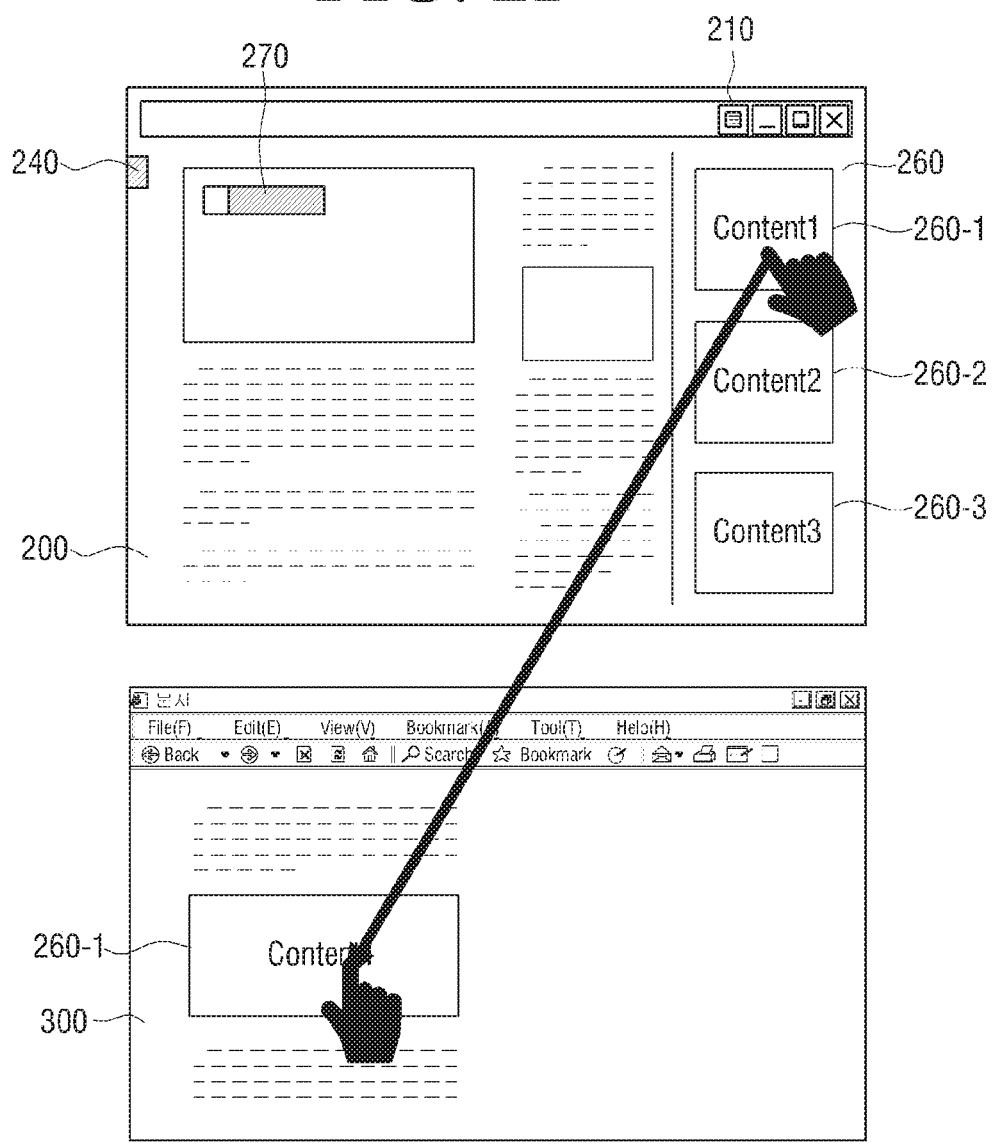

If a first content 260-1 displayed in the content list 260 is dragged onto a document file screen 300 of another screen as shown in FIG. 2I, the controller 170 pastes the first content 260-1 to a document file. Here, if the first content 260-1 is an image content, the controller 170 pastes the first content 260-1 in an image file format. If the first content 260-1 is a text content, the controller 170 pastes the first content 260-1 in a text file format. If the first content 260-1 is a combination of an image content and a text content, the controller 170 may paste the first content 260-1 in an image file format or a combination format of an image file and a text file.

It has been described that a content is pasted to a document file through a drag operation, but this is only an embodiment. Therefore, a content may be copied and pasted to a document file through a menu or a keyboard shortcut.

Figure 2J:
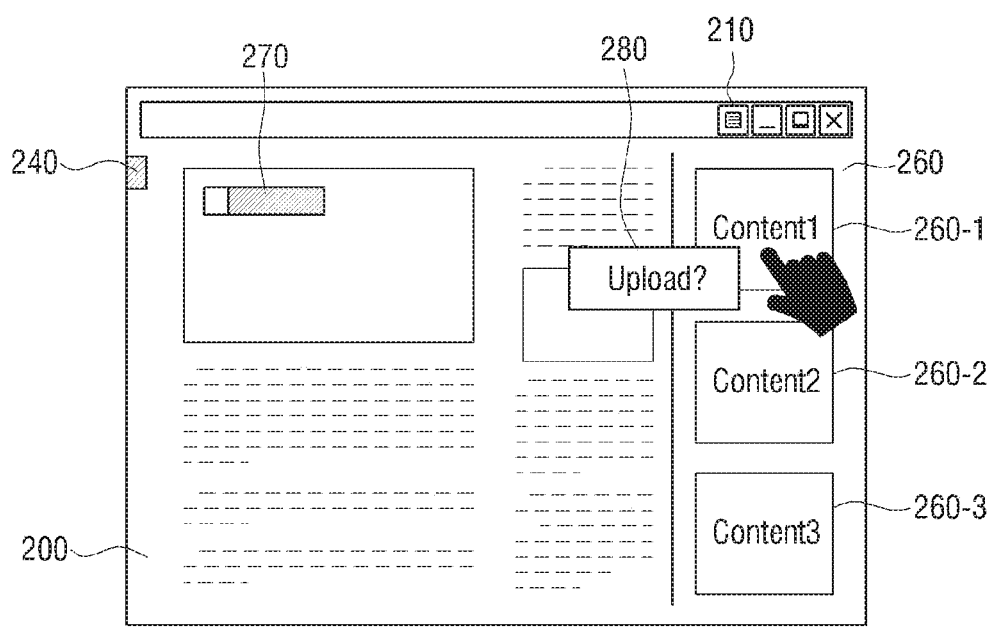

Also, the controller 170 may upload at least one content included in the content list 260. If the first content 260-1 is touched twice consecutively as shown in FIG. 2J, the controller 170 displays an upload menu icon 280. Here, if the upload menu icon 280 is touched, the controller 170 controls the communicator 140 to upload the first content 260-1 to a path and a position designated by the user.

Figure 2K:
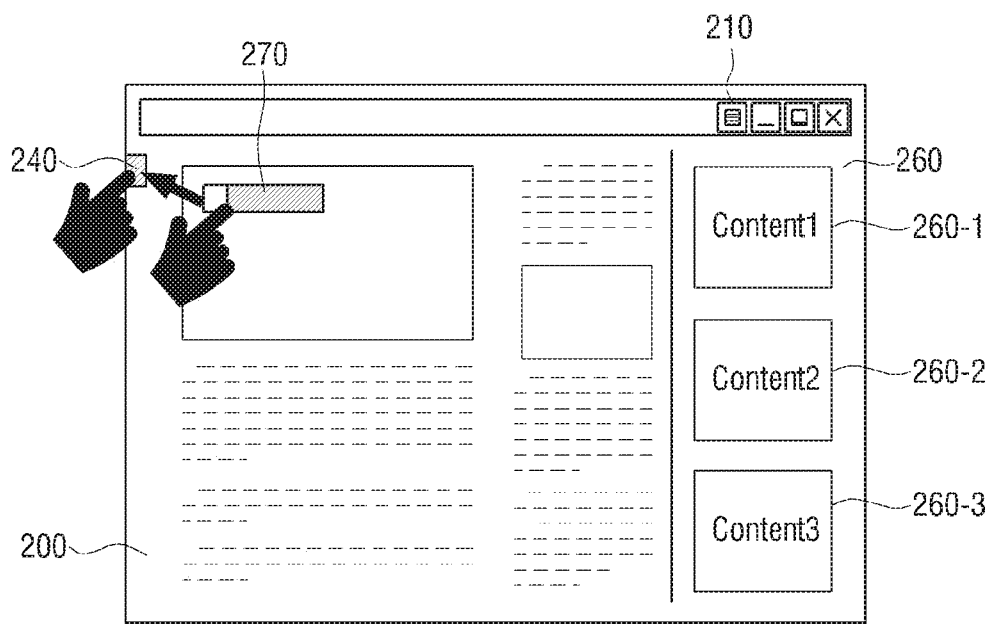

The controller 170 may also delete setting of a category designated in the particular content area 250 through user input. If the flag mark 270 displayed around the particular content area 250 is dragged to the flag 240 displayed at the top left as shown in FIG. 2K, the controller 170 may delete setting of the category designated in the particular content area 250.

There has been described a method for setting a particular content to a category corresponding to a flag by using one flag with reference to FIGS. 2A through 2K, but this is only an embodiment. Therefore, content may be classified and managed according to categories by using at least two or more flags.

FIG. 3 is a diagram illustrating a display screen 200 including at least two or more flags according to an embodiment of the present invention.

As shown in FIG. 3, three flags 240-1, 240-2, and 240-3 are displayed on the display screen 200. The three flags 240-1, 240-2, and 240-3 respectively have different categories and colors. For example, the first flag 240-1 may be a sports category, the second flag 240-2 may be a Japan travel category, and the third flag 240-3 may be a famous restaurant category.

A method for setting a particular content to a category corresponding to a flag to provide content by using a flag is as described with reference to FIGS. 2A through 2K.

The multimedia apparatus 100 has been described as including the storage unit 110, the A/V processor 120, the display unit 130, the touch panel 135, the communicator 140, the GUI generator 150, the user operator 160, and the controller 170. However, this is only an embodiment of the present invention, and thus the multimedia apparatus 100 may further include structures besides the above-described structures or may not include the above-described structure.

For example, the multimedia apparatus 100 may be realized only through a GUI generator, a display unit, and a controller. Specifically, the GUI generator of the multimedia apparatus 100 may generate at least one flag, and the display unit may display the at least one flag. Also, the controller may designate categories with respect to the at least one flags according to a particular input of a user, and if one of the at least one flags is moved to a particular content displayed on the display unit, may set the particular content to a category corresponding to the one flag.

As described above, the user may classify and manage content according to categories by using at least one flag 230 so as to further intuitively manage and access the content.

A method for providing content by using a flag will now be described in detail with reference to FIG. 4. FIG. 4 is a flowchart illustrating a method for providing content by using a flag of the multimedia apparatus 100 according to an embodiment of the present invention.

In step S410, the multimedia apparatus 100 generates at least one flags on a screen through a particular input of a user. If the flag generating icon 210 is selected, the multimedia apparatus 100 generates a flag.

In step S420, the multimedia apparatus 100 respectively designates categories with respect to the at least one flags. In step S430, the multimedia apparatus 100 edits attributes of the at least one flags through an input of the user. Specifically, the multimedia apparatus 100 may edit a color and a name of a flag input by the user to edit an attribute of the flag.

If the categories with respect to the at least one flag is respectively set, the multimedia apparatus 100 determines whether the at least one flags have been moved to a particular area of the screen through user input, in step S440. If it is determined in step S440 that the at least one flags have been moved to the particular area of the screen, the multimedia apparatus 100 displays the at least one flags in the particular area of the screen regardless of a screen change of the screen in step S450.

In step S460, the multimedia apparatus 100 selects particular content displayed on the screen through user input. In step S470, the multimedia apparatus 100 moves the at least one flags to the selected particular content. In step S480, the multimedia apparatus 100 sets the selected particular content to a category corresponding to the moved flag.

As described above, the multimedia apparatus 100 classifies and manages content according to categories by using a flag, and thus a user may further intuitively manage and access content.

While the present invention has been shown and described with reference to various embodiments thereof, various changes in form and detail may be made and the present invention may be applied to other types of apparatuses. The description of the embodiments is intended to be illustrative, and it will be appreciated by those skilled in the art that many changes, alternatives, modifications, and variations may be made without departing from the scope and spirit of present invention, defined by the appended claims.

What is claimed is:

1. A method for providing content of a multimedia apparatus using one or more visual elements, the method comprising:
   displaying a first visual element and contents on a screen;
   in response to receiving a user command for selecting a particular area of the screen, setting the particular area of the screen, wherein the particular area comprises at least one content;
   in response to receiving a user command for moving the first visual element to the particular area, setting the at least one content included in the particular area to be designated by an attribute of the first visual element and displaying a second visual element on the at least one content designated by the attribute of the first visual element; and
   in response to receiving a user command for selecting the first visual element, displaying a content list comprising the at least one content designated by the attribute of the first visual element.

2. The method of claim 1, further comprising:
   displaying a visual element generation icon as part of a display window of an active application; and
   in response to receiving a user command for selecting the visual element generation icon, displaying a visual element generation menu including an area to input values for one or more attributes of a new visual element.

3. The method of claim 2, wherein the one or more attributes comprise at least one of a name, a color, and a category.

4. The method of claim 2, wherein the active application includes a website address.

5. The method of claim 1, wherein the first visual element includes a flag.

6. The method of claim 1, further comprising:
   generating one or more visual element on a screen;
   designating categories with respect to the one or more visual elements;
   moving one visual element to the particular area of the screen; and
   changing the one visual element to a smaller size when in the particular area.

7. The method of claim 1, wherein the contents comprise at least one of a video content, an image content and a text content, and
   wherein if the contents having different types than each other are in the particular area, the setting sets the contents having different types than each other to be designated by an attribute of the first visual element.

8. A multimedia apparatus comprising:
   a display unit comprising a screen; and
   a controller configured to:
      control the display to display a first visual element and contents on the screen;
      in response to receiving a user command for selecting a particular area of the screen, set the particular area of the screen, wherein the particular area comprises at least one content;
      in response to receiving a user command for moving the first visual element to the particular area, set the at least one content included in the particular area to be designated by an attribute of the first visual element and control the display to display a second visual element on the at least one content designated by the attribute of the first visual element; and
      in response to receiving a user command for selecting the first visual element, control the display to display a content list comprising the at least one content designated by the attribute of the first visual element.

9. The multimedia apparatus of claim 8, wherein the screen comprises a touchscreen.

10. The multimedia apparatus of claim 8, wherein the controller is further configured to:
    generate one or more visual elements on the screen;
    designate categories with respect to the one or more visual elements;
    move one visual element to the particular area of the screen; and
    change the one visual element to a smaller size when in the particular area.

* * * * *